United States Patent [19]
Levatter et al.

[11] Patent Number: 6,139,182
[45] Date of Patent: Oct. 31, 2000

[54] ENHANCED PROTECTIVE COVER FOR USE IN AN IR THERMOMETER

[75] Inventors: Jeffrey I. Levatter, Santa Fe; Michael W. MacCollum, Poway, both of Calif.

[73] Assignee: Thermoscan, Inc, San Diego, Calif.

[21] Appl. No.: 09/259,355

[22] Filed: Mar. 1, 1999

[51] Int. Cl.⁷ .............................. G01K 1/08; A61B 6/00; A61B 5/00
[52] U.S. Cl. .......................... 374/158; 600/474; 600/549
[58] Field of Search .................... 374/158, 209, 374/208; 600/474, 549, 203

[56] References Cited

U.S. PATENT DOCUMENTS

| | | | |
|---|---|---|---|
| 4,662,360 | 5/1987 | O'Hara et al. | 374/158 |
| 5,088,834 | 2/1992 | Howe et al. | 374/209 |
| 5,707,343 | 1/1998 | O'Hara et al. | 374/158 |
| 5,906,473 | 5/1999 | Lin | 374/158 |

*Primary Examiner*—Diego Gutierrez
*Assistant Examiner*—Stanley J. Pruchnic, Jr.
*Attorney, Agent, or Firm*—Hopgood, Calimafde, Kalil & Judlowe

[57] ABSTRACT

A probe cover for use with an IR thermometer includes a cover comprising a conical sidewall and an infrared transmissive window at its tip. A bushing is inserted into the interior of the tip of the cover to produce an outward radial force against the adjacent sidewall. The bushing flattens the film membrane forming the window and thus enhances distortion free transmission of IR radiation.

18 Claims, 3 Drawing Sheets

ENHANCED PROTECTIVE COVER FOR USE IN AN IR THERMOMETER

FIELD OF THE INVENTION

The present invention relates generally to a protective cover for an infrared sensor, and more particularly to an improved protective cover for use with an infrared thermometer probe or speculum.

BACKGROUND OF THE INVENTION

One of the most significant developments in patient temperature measurement in recent years has been that of the non-contact infrared (IR) thermometer such as that disclosed in U.S. Pat. No. Re: 34,789 to Fraden, the contents of which are incorporated herein by reference. The IR thermometer typically includes a sensitive infrared detector and an optical system that guides the radiation from the tympanic membrane of the patient's ear to the sensor for measurement. The sensed radiation is converted to a temperature reading that is closely correlated to the patient's temperature. Importantly, the measurement is completed within one or two seconds and with minimal discomfort to the patient.

Particularly in a hospital or clinic setting, care must be taken to prevent the spread of infectious agents and cross-contamination of patients whose temperatures are taken on a periodic basis by the use of an IR thermometer. In addition, the optical element of the infrared thermometer must remain clear of ear wax in order to operate reliably. To meet these concerns, a protective cover is almost always placed over the IR thermometer sensor probe to provide a sanitary barrier that precludes direct physical contact between the IR sensor and the patient's ear, and which is typically discarded and replaced with a new probe cover after each use.

Previously developed clinical thermometers that come into contact with mucous membranes to sense temperature also required the use of a disposable cover as a sanitary barrier. These prior sanitary covers typically included a rigid wall and a thin film contiguous with the contact sensor element that was often stretched to minimize the thermal barrier to conductive heat transfer. Exemplary early thermometer covers of this type are described in U.S. Pat. No. 3,822,593 to Oudewaal and U.S. Pat. No. 3,987,899 to Vyprachticky.

Disposable covers, which have been employed with the more recently developed infrared thermometer, have generally been closely modeled on those that were used with the earlier contact thermometers. For example, U.S Pat. Nos. 5,293,862 and 5,179,936 to O'Hara et al. disclose a two-piece protective disposable cover for an infrared thermometer in which a thin transparent film is bonded to a rigid tubular body. The manufacturing process of this cover, however, may cause the formation of wrinkles in the thin transparent film that could interfere with infrared transmission between the tympanic membrane of the ear and the IR sensor of the thermometer. To ensure that no wrinkles are formed, the transparent film has been stretched over the infrared sensor.

However, stretching the film to prevent the formation of wrinkles has been found to create other sources of potential measurement inaccuracies. First, a film that is stretched may stretch in a non-uniform manner creating a "lensing" effect that could distort transmitted infrared radiation. Second, stretching the film may result in a realignment of the polymer molecular structure that could cause variations in both the reflective and absorptive properties of the film. Accordingly, these infrared probe covers could display unpredictable transmission properties when they were fitted onto a probe of an infrared thermometer.

U.S. Pat. No. 4,911,559 to Meist and Suszinski discloses an infrared probe cover that is also susceptible to the effects of stretching the film when the cover is placed over an infrared thermometer probe. The effects caused by this stretching of the film adversely affected the transmissivity of the film to IR energy in unpredictable ways that often resulted in errors in temperature measurement.

Other prior art infrared thermometer probe covers were often configured so that the transparent thin film came into contact with the patient's skin. If the patient's skin is at a different temperature than that of the probe cover, a temperature gradient is formed in the film as heat conduction triggers an energy flow from the warmer ear to the cooler film. The resulting elevated temperature of the film amplifies an error source known as "secondary radiation", which refers to the infrared radiation that the cover emits relative to the infrared radiation emitted by the primary source, viz. the tympanic membrane of the ear. Such secondary radiation may introduce temperature measurement inaccuracies.

U.S. Pat. No. 5,179,936 describes a disposable sanitary probe cover for use with an infrared thermometer in which a plastic film or membrane, which serves as the IR window, is stretched across the front end of the tubular body portion of the disposable speculum. The fabrication of this device, however, requires precise control in order to maintain proper performance and the correct degree of stretch, and is accordingly relatively costly. In addition, this cover is only suitable for a single use, which makes it unacceptable for use in the international consumer markets.

An improved unitary disposable protective cover for use with an infrared thermometer is disclosed in U.S. Pat. No. 5,795,067 to Fraden, et al. and U.S. Pat. No. 5,088,834 to Howe, et al., the contents of which are incorporated by reference as if restated in full. The cover disclosed in the '067 patent includes an IR window secured to a thin sidewall by means of a collar structure which either isolates the film from externally applied forces or develops counter forces in a way that precludes stretching of the film and other effects that would disturb IR transmission through the window. While this protective cover provides a significant advantage over prior probe covers, there are several issues relating to its use.

SUMMARY OF THE PRESENT INVENTION

It is an object of the present invention to provide an improved probe cover for use with an IR thermometer that provides improved repeatability of IR transmission and more reliable temperature measurement.

It is another object of the invention to provide a probe cover of the type described to remove distortion causing characteristics from a film membrane window without interaction with the IR speculum.

It is a further, more specific object of the invention to provide a probe cover of the type described in which a thin film or membrane that serves as a window for IR transmission is maintained at a prescribed distance away from the distal end of the thermometer speculum without the need to maintain and achieve exceptionally tight tolerances on either the cover or the probe.

The probe cover of the present invention includes a hollow speculum cover having an integral membrane or window across its upper end, and a rigid or semi-rigid bushing or rim inserted into the cover adjacent the window to provide increased circumferential tautness thereto.

The bushing is sized and shaped to fit into the cover interior so as to maintain the window at a predetermined orientation. The bushing is preferably inserted into the disposable cover as a separate component of the composite structure. The outer diameter of the bushing is preferably slightly larger than the inner diameter of the probe cover, so that the insertion of the bushing into the cover causes the membrane to be pulled taut by the radial force exerted on the cover sidewall by the bushing. The bushing may be flexible to allow easy insertion, and made of a deformable material to enhance comfort. The bushing requires sufficient dimensional stability so that the radial forces are sufficient to provide a flat membrane.

The present invention is directed to a probe cover for an IR thermometer, substantially as defined in the appended claims and as described in the following detailed specification as considered with the accompanying drawings in which:

BRIEF DESCRIPTION OF THE FIGURES

FIG. 3b is an upper plan view of the bushing of FIG. 3a;

DETAILED DESCRIPTION OF THE PREFERRED EMBODIMENT

Figure 1:
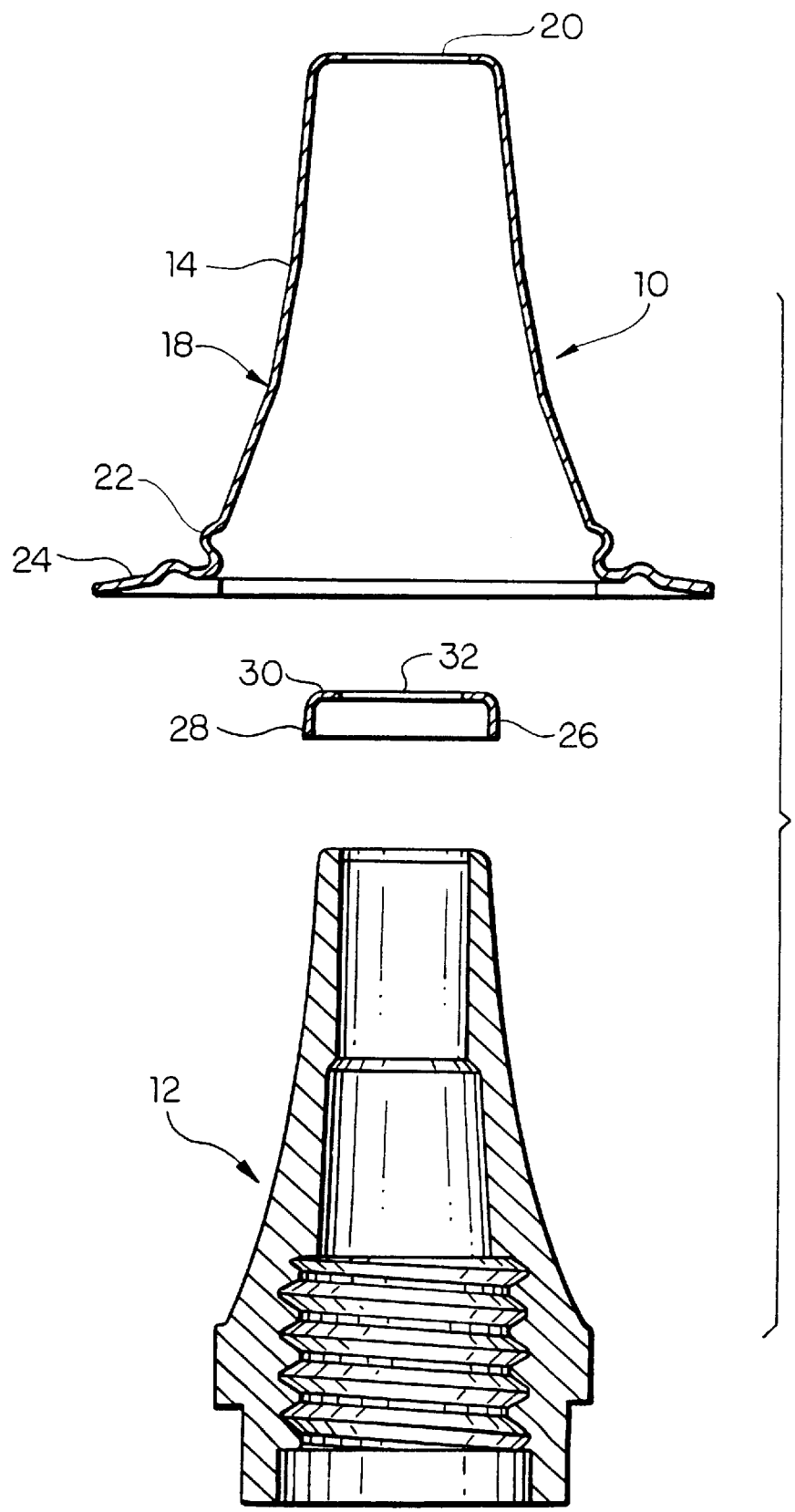
FIG. 1 is an exploded view of a probe cover and an insertable framing cup-shaped bushing in accordance with an embodiment of the present invention.
Figure 2:
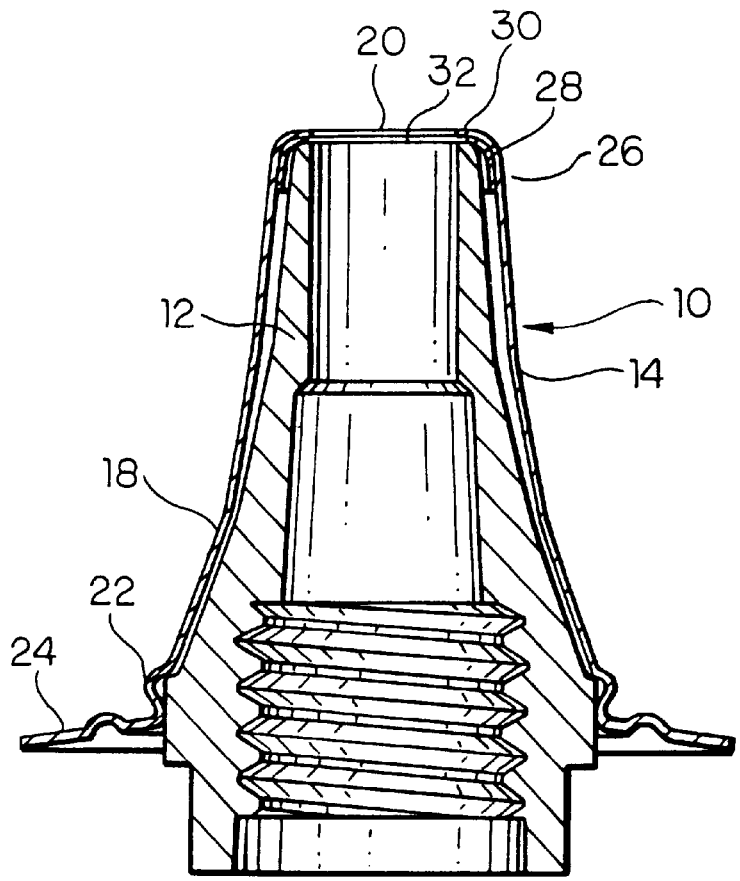
FIG. 2 is a vertical cross-section of the assembled probe cover of FIG. 1 placed over the end of an IR thermometer probe or speculum.
Figure 3A:
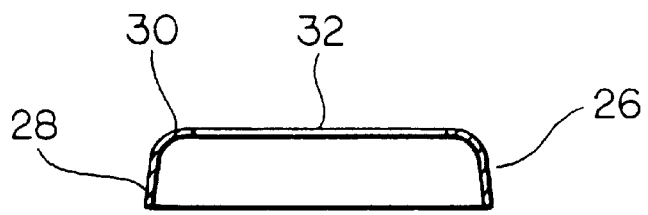
FIG. 3a is a vertical cross-section, on an enlarged scale as compared to FIGS. 1 and 2, of the framing cup-shaped bushing of the embodiment of FIG. 1.
Figure 3B:
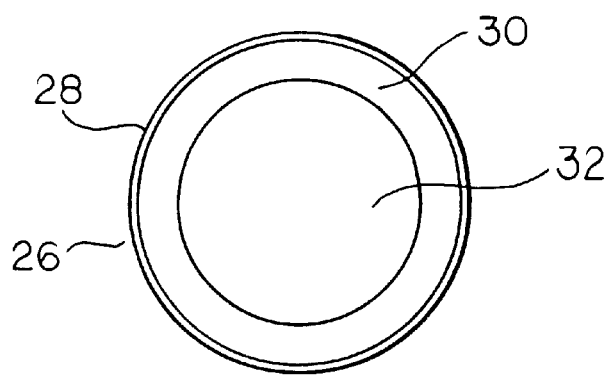

The probe cover of the invention is designed to be placed over the probe or speculum of an otherwise conventional IR thermometer. As shown in FIGS. 1–5, with specific reference to FIGS. 1 and 2, illustrating an embodiment of the invention, the probe cover generally designated 10, when in use, is placed over the tip of a probe or speculum 12 (FIG. 2) of an IR thermometer.

The probe cover 10 of the present invention include two separate components, a thermoformed outer cover 14 shown in the form of a frusco-conical hollow cap, and a circular bushing 26 inserted or wedged into the tip of cover 14. Cover 14, which may advantageously be of the type disclosed in U.S. Pat. No. 5,795,067 and/or U.S. Pat. No. 5,088,834, includes a tapered side wall 18, and an integral optical film membrane or window 20 at its upper end or tip. Cover 14 further includes an annular ring 22 near its lower end and terminates at its lower end in an annular skirt or flange section 24.

Cover 14 is preferably formed of a polymer such as polypropylene, polyethylene or co-polymers thereof. It is preferably of a thickness that ranges between 0.02 to 0.0005 inches or 500 to 12.5 microns thick, and is preferably transparent to infrared radiation. In use, the speculum or probe 12 covered by the probe cover 14 is placed into the patient's ear, and infrared radiation from the tympanic membrane passes through the window 20 of the probe cover, down a waveguide to impinge on an IR sensitive sensor.

To achieve optimum reliability and repeatability of IR transmission through the membrane or window 20, the window should be an optically flat surface substantially free of wrinkles or other distortion causing deformations that may adversely affect IR transmissivity through the window.

To achieve this end, in accordance with the present invention, a small round member in the form of a semi-rigid or rigid ring-shaped bushing 26 is snugly fitted into the interior of the cover 14 substantially up to the cover tip just below the window 20. Placement of the bushing preferably is accomplished by automated insertion thereof into the interior of the cover.

In the embodiment of FIGS. 1–4, the bushing or cap 26 includes an annular wall 28 having an upper flange 30 extending slightly radially inwardly of its distal end so as to leave an opening or window 32, which preferably is of a diameter that is slightly less than that of window 20 but has an area that is slightly larger than the viewing area of the distal end of infrared probe 12.

Figure 5:
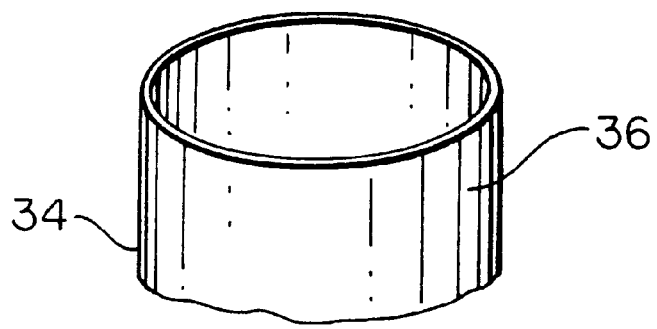
FIG. 5 is a perspective of a framing member in accordance with an alternative embodiment of the invention.
Figure 4:
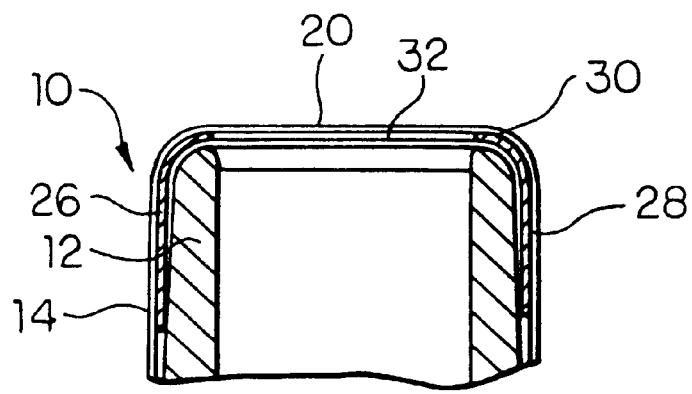
FIG. 4 is a vertical cross-section of the portion of the tip of the assembled probe cover enclosed in the dashed circle in FIG. 2.

Bushing 26 is preferably molded of a plastic material such as polyethylene or polypropylene, although other materials may be substituted to achieve a balance in cost functionality, and preferably has a thickness of between 0.001 and 0.010 inch. The outer diameter of the bushing 26 is slightly greater than the inner diameter of the tip of the probe cover 10, so that when the bushing is inserted into the cover tip, as shown in FIGS. 2 and 5, it will exert a radially outward force on the inner wall of the cover which, in turn, causes the window member 20 to be pulled or stretched radially outwardly to a taut condition. As a result, the probe window 20 is consistently and uniformly tensioned and free of wrinkles or other distortions to IR transmission, independent of the insertion of the speculum into the probe cover.

Figure 6:
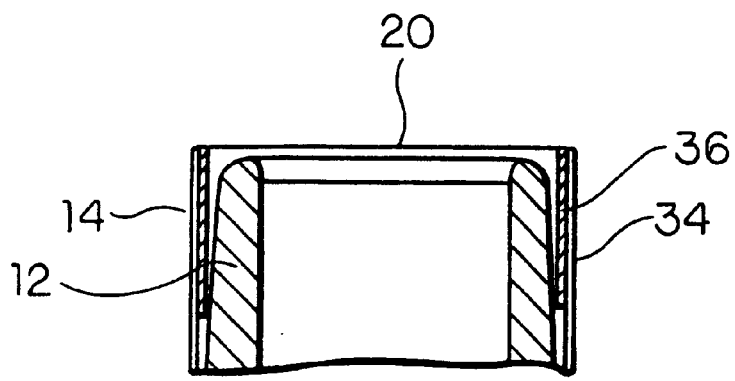
FIG. 6 is a vertical cross-section similar to FIG. 4 of a probe cover tip that includes the framing member of FIG. 5.

The bushing 34, in accordance with an alternative embodiment illustrated in FIGS. 5 and 6, is in the form of a ring that includes an annular wall 36 whose diameter is substantially uniform between its proximal and distal ends. The annular ring bushing 34 acts similar to the bushing illustrated in FIGS. 1–4 in that when it is in inserted into the tip of the cover, it exerts an outward radial force on the inner wall of cover creates a tensioning force on the window 20.

In either of the above embodiments, the bushing may be configured so as to link with a speculum of the IR thermometer in a pre-determined way so that the window, so framed, is positioned over said speculum, spaced therefrom, but with a repeatable and controlled posture. This will further enhance the overall accuracy of the measurement.

It will be appreciated from the foregoing description of two presently preferred embodiments that the probe cover of the present invention including the inserted framing member provides additional support to the tip of the probe cover that maintains a stretching tension on the probe cover window, and also maintains the window at a prescribed distance away from the distal end of the speculum. It will also be appreciated that modifications may be made to these embodiments without necessarily departing from the spirit and scope of the invention.

What is claimed Is:

1. An IR thermometer probe cover comprising:
   a hollow, conically-shaped cup having a window portion capable of transmitting therethrough a significant amount of IR radiation incident thereon at the distal end thereof, said cup configured to fit over and enclose an IR thermometer probe; and a bushing sized and shaped to fit in the interior of said cup adjacent said window so as to hold said window at the predetermined position relative to said probe;

wherein an outer cross-section of the bushing and an inner cross-section of said cup have relative diameters effective to form an interference fit.

2. The cover of claim 1 wherein said cup includes a sidewall extending down from said window and said bushing engages said sidewall to exert a radial force against said sidewall.

3. The cover of claim 2 wherein said bushing has a substantially circular shape with a thin wall formed between an inner and outer surface.

4. The cover of claim 3 wherein said outer surface has a curved cross section.

5. The cover of claim 3 wherein said bushing includes an inwardly curved flange.

6. The cover of claim 3 wherein said bushing is formed from a polymeric material.

7. The cover of claim 3 wherein said inner surface engages said probe to position said window in a pre-established position relative to said probe.

8. The cover of claim 1 wherein said window is substantially free of wrinkles and/or other distortion causing characteristics prior to engaging said probe.

9. The cover of claim 1, wherein said cover has a viewing area wherein said bushing has an upper end defining an opening, said opening in said bushing being greater than the viewing area of the IR thermometer.

10. A probe cover for use with an infrared thermometer, said cover having a window at its tip capable of transmitting therethrough a significant portion of IR radiation incident thereon, and a sidewall thereabout, said probe cover comprising:

a window frame contiguous with said sidewall and inserted into the interior of said cover, said frame creating an outward radial force on said sidewall near said tip, thereby producing a tensioning force on said window, wherein said window frame includes an annular member joined to said sidewall joined by an interference fit.

11. The probe cover of claim 10, in which said window frame comprises a rigid bushing.

12. The probe cover of claim 10, in which said window frame includes a semi-rigid bushing.

13. The probe cover of claim 10 in which said annular member includes a radial inward flange extending from the upper end of said annular window.

14. A method for measuring patient temperature using an IR thermometer, including the steps of:

(a) placing a bushing-cover combination over an IR receiving end of said thermometer, said bushing-cover combination comprising a bushing and a cup-shaped cover, said cover including an IR transmissive membrane at one end, and said bushing including an inwardly directed flange to support an outer rim of said membrane, wherein said bushing is positioned in said cover near said membrane so as to extend the membrane into a planar configuration that is substantially free of distortion producing characteristics; and (b) measuring IR radiation passing between said patient and an IR sensor in said thermometer and determining patient temperature based thereon.

15. The method of claim 14 wherein said bushing is a piece separate from said cover and said method further comprises assembling the cover and bushing into said combination.

16. The method of claim 14 wherein said bushing is positioned in said cover so as to exert a radial force causing tension in said membrane.

17. The method of claim 14 wherein said cover is made of a unitary configuration comprising said membrane as an IR transmissive window and a sidewall.

18. The method of claim 14 wherein said cover is further positioned on said IR thermometer so as to prevent contact between said membrane and said IR thermometer.

* * * * *